United States Patent
Umezawa (10) Patent No.: US 9,869,859 B2
(45) Date of Patent: Jan. 16, 2018

(54) FOCUS DEPTH EXTENSION IMAGE FORMING OPTICAL SYSTEM, FOCUS DEPTH EXTENSION ELEMENT, AND IMAGING APPARATUS

(71) Applicant: Yuko Umezawa, Kanagawa (JP)

(72) Inventor: Yuko Umezawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 9 days.

(21) Appl. No.: 15/054,747

(22) Filed: Feb. 26, 2016

(65) Prior Publication Data

US 2016/0259164 A1 Sep. 8, 2016

(30) Foreign Application Priority Data

Mar. 3, 2015 (JP) .................................. 2015-041223

(51) Int. Cl.
| | |
|---|---|
| *G02B 3/02* | (2006.01) |
| *G02B 13/18* | (2006.01) |
| *G02B 27/00* | (2006.01) |
| *G02B 5/00* | (2006.01) |
| *H04N 5/225* | (2006.01) |

(52) U.S. Cl.
CPC ......... *G02B 27/0075* (2013.01); *G02B 5/005* (2013.01); *G02B 13/18* (2013.01); *H04N 5/2254* (2013.01); *H04N 5/2259* (2013.01)

(58) Field of Classification Search
CPC . G02B 27/0075; G02B 27/0025; G02B 13/18
USPC .......... 250/201.2, 201.4; 359/368, 385, 386, 359/558, 577, 737; 382/106
See application file for complete search history.

(56) References Cited

U.S. PATENT DOCUMENTS

| | | | |
|---|---|---|---|
| 2005/0122596 A1 | 6/2005 | Ohashi | |
| 2011/0261247 A1* | 10/2011 | Mathieu | ............. G02B 13/0025 348/340 |
| 2011/0261468 A1 | 10/2011 | Sato | |

(Continued)

FOREIGN PATENT DOCUMENTS

| | | |
|---|---|---|
| JP | 2005-148420 | 6/2005 |
| JP | 2011-227421 | 11/2011 |

OTHER PUBLICATIONS

Hideyuki Tamura "Computer Image Process" Ohmsha, Ltd., Dec. 20, 2002, pp. 120-123 (with English Translation of Relevant Portions).

*Primary Examiner* — Mahidere Sahle
(74) *Attorney, Agent, or Firm* — Oblon, McClelland, Maier & Neustadt, L.L.P.

(57) ABSTRACT

A focus depth extension image forming optical system includes a focus depth extension element that extends a depth of focus of an image forming optical system. The focus depth extension element added to the image forming optical system has an aspheric surface shape rotationally symmetric about an optical axis of the image forming optical system, a sag amount Z of the aspheric surface shape changes at least to be negative, positive, and negative or positive, negative, and positive in accordance with an increase in a distance from the optical axis, in a range of $0<|t|<0.4$ where $|t|$ is a normalized radius of the aspheric surface shape, a maximum value of $|dZ/dt|$ is 0.4 or more, and in one or more point of a range of $0.4 \leq |t| < 0.8$, $dZ/dt=0$.

9 Claims, 8 Drawing Sheets

(56) References Cited

U.S. PATENT DOCUMENTS

2015/0261987 A1\* 9/2015 Morihisa ............ G06K 7/10732
235/455

\* cited by examiner

FOCUS DEPTH EXTENSION IMAGE FORMING OPTICAL SYSTEM, FOCUS DEPTH EXTENSION ELEMENT, AND IMAGING APPARATUS

CROSS-REFERENCE TO RELATED APPLICATION

The present application is based on and claims priority to Japanese patent application No. 2015-041223, filed Mar. 3, 2015, the disclosure of which is hereby incorporated by reference herein in its entirety.

BACKGROUND

Technical Field

The present invention relates to a focus depth extension imaging optical system, a focus depth extension element, and an imaging apparatus.

Description of Related Art

An imaging apparatus including an imagining element (hereinafter referred to as an image sensor) such as a CCD sensor and a CMOS sensor has been known as described in Patent Literature 1 (Japanese Laid-Open Patent Application No. 2011-227421). Patent Literature 1 describes a depth-of-field-extended optical system configured by adding a light modulation plate to an image forming optical system which images an image of a target. The depth-of-field-extended optical system is configured to restore an image having a deep depth of focus by executing a digital process on an image imaged by an image sensor.

In this specification, a depth of field is referred to as a depth of focus, an optical element that extends a depth of focus of an image forming optical system as the light modulation plate is referred to as a focus depth extension element, and an image forming optical system to which the focus depth extension element is added is referred to as a focus depth extension image forming optical system.

The light modulation plate of the depth-of-field-extended optical system described in Patent Literature 1 has a refracting power to match the peaks of the defocus MTF between the imaging only by the imaging optical system and the imaging by the depth-of-field extended optical system.

SUMMARY

An object of the present invention is, therefore, to provide a new focus depth extension imaging optical system including a focus depth extension element.

To achieve the above object, an aspect of the present invention provides a focus depth extension image forming optical system including: a focus depth extension element that extends a depth of focus of an image forming optical system, wherein the focus depth extension element that is added to the image forming optical system has an aspheric surface shape rotationally symmetric about an optical axis of the image forming optical system, a sag amount Z of the aspheric surface shape changes at least to be negative, positive, and negative or positive, negative, and positive in accordance with an increase in a distance from the optical axis, in a range of $0<|t|<0.4$ where $|t|$ is a normalized radius of the aspheric surface shape, a maximum value of $|dZ/dt|$ is 0.4 or more, and in one or more point of a range of $0.4 \leq |t| < 0.8$, $dZ/dt=0$.

DETAILED DESCRIPTION

Figure 1:
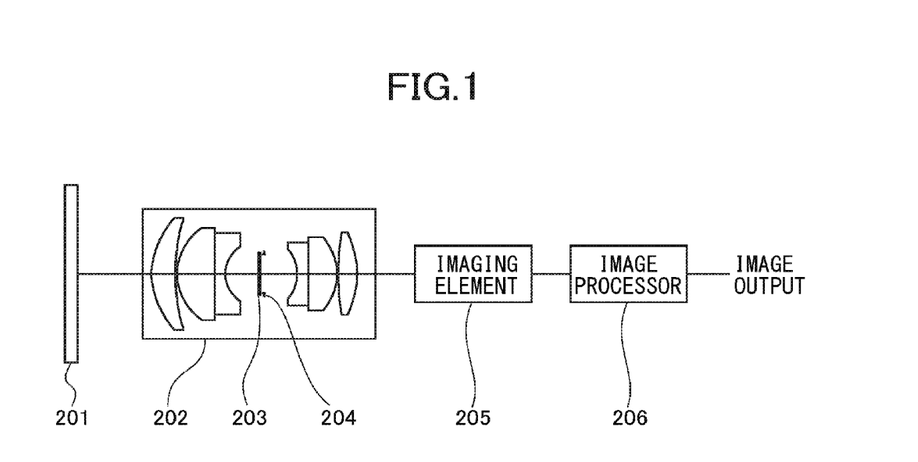
FIG. 1 is a view illustrating an imaging apparatus according to an embodiment of the present invention.

Hereinafter, an embodiment of the present invention will be explained with reference to the drawings. FIG. 1 is a view illustrating an imaging apparatus according to the embodiment of the present invention. The imaging apparatus shown in FIG. 1 includes a focus depth extension image forming optical system 202, an imaging element 205 that images an image of a target 201 by the focus depth extension image forming optical system 202, and an image processor 206 that executes an image process on the image by the imaging element 205. Hereinafter, the focus depth extension image forming optical system 202 is referred to as an imaging lens unit 202 and the target 201 is also referred to as a subject 201. In this embodiment, the subject 201 is, for example, a bar code, a two dimensional code, or a character string. These codes and character sting are read by the imaging apparatus. The imaging lens unit 202 includes a plurality of lenses, an aperture stop 204, and a phase plate 203 as the focus depth extension element. The phase plate 203 is inserted near the aperture stop 204.

The phase plate 203 as the focus depth extension element generates aberration that extends a depth of focus, and diffuses an imaging light flux such that a point spread function (PSF) on an imaging plane of the imaging element 205 is obtained by two pixels or more. The image of the subject 201 is imaged on a light-receiving plane of the imaging element 205 by the imaging lens unit 202 with the aberration that extends a depth of focus. The phase plate 203 can be detached from the imaging lens unit 202. An optical system from which the phase plate 203 is detached is an image forming optical system. Namely, the phase plate 203 as the focus depth extension element is detachable to the image forming optical system, and the image forming optical system to which the phase plate 203 is added is the focus depth extension image forming optical system 202. The image forming optical system from which the phase plate 203 is detached has an imaging function. Hereinafter, the image forming optical system may be referred to as a lens unit.

When singularly using the lens unit, the image of the subject 201 by the lens unit is imaged on the light-receiving plane of the imaging element 205. In this case, since the aberration that extends a depth of focus is not generated, the depth of focus of the lens unit is not extended. A typical solid-state imaging element such as a CCD sensor and a CMOS sensor is used as the imaging element 205. The image data is output from the imaging element 205, and the output image data is input to the image processor 206. The image processor 206 executes a process of restoring a point spread function (PSF) diffused by the phase plate 203.

A computer, a CPU, or an integrated circuit such as Field-Programmable Gate Array (FPGA) is used as the image processor 206. When a computer or a CPU is used as the image processor 206, the image process is executed by software. When an FPGA is used as the image processor 206, the image process is executed by hardware. The phase plate 203 as the focus depth expansion element is added to the lens unit as the image forming optical system and has an aspheric surface shape rotationally symmetric about the optical axis of the lens unit. A sag amount Z of the aspheric surface shape changes at least to be negative, positive, and negative or positive, negative, and positive in accordance with an increase in a distance from the optical axis of the lens unit.

This aspheric surface is normalized. Namely, with the position of the optical axis as the original point, an effective radius of an aspheric surface area is RG and the distance from the optical axis is r ($-RG \leq r \leq RG$). In this case, $t=r/RG$ represents a normalized coordinate. Since the domain of r is $-RG \leq r \leq RG$, the domain of t is $-1 \leq t \leq +1$ and $0 \leq |t| \leq 1$ when an absolute value is used. |t| represents a normalized radius.

The aspheric surface shape of the phase plate 203 satisfies the following conditions.

Namely, in $0<|t|<0.4$, the maximum value of $|dZ/dt|$ is 0.4 or more, and in one or more point of $0.4 \leq |t| <0.8$, $dZ/dt=0$.

To extend a depth of focus, the sag amount is significantly changed in a positon away from the center of the focus depth extension element. It is, however, difficult to maintain a high resolution of a restored image only by such a change in the sag amount. In the focus depth extension image forming optical system of this embodiment, the shape of the sag amount satisfies the above conditions near the center and the circumference of the focus depth extension element having the rotationally symmetrical aspheric surface shape. Consequently, the depth of filed can be increased, and the resolution of the restored image can be maintained with high accuracy. To further increase the depth of focus and maintain the resolution of the restored image with higher accuracy, it is more preferable for the aspheric surface shape to satisfy the following condition. Namely, in $0.4 \leq |t| <0.8$, the minimum value of $dZ/dt$ is $-0.1$ or less and the maximum value is $+1.0$ or more. More specifically, it is preferable for the change ratio of sag amount (tilt) to be large in $0.4 \leq |t| <0.8$.

Figure 2:
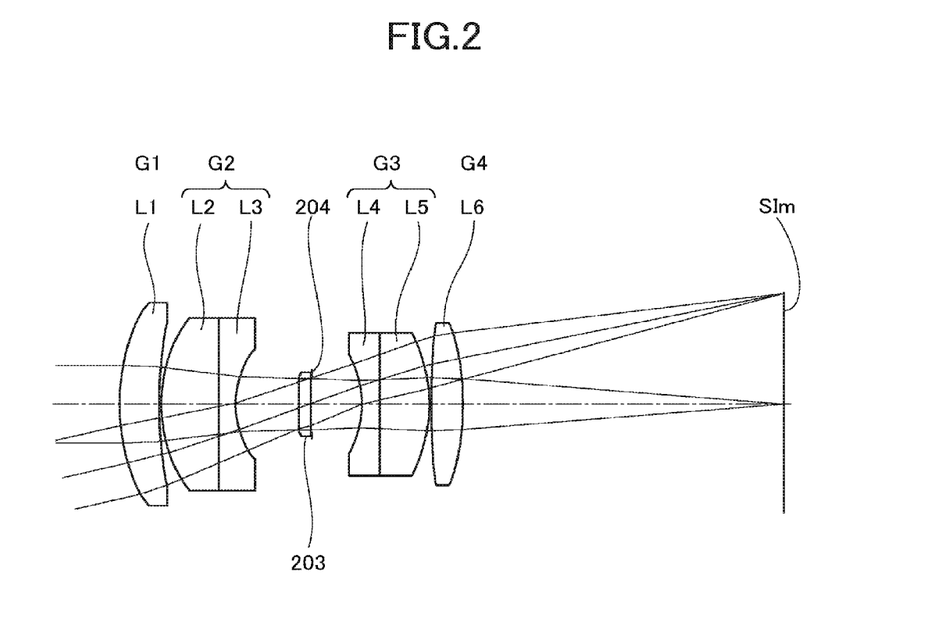
FIG. 2 is a view illustrating a focus depth extension imaging optical system of the imaging apparatus in FIG. 1.

Two examples of the focus depth extension optical system will be described below. Although the same image forming optical system (lens unit) to which the phase plate 203 as the focus depth extension element is not added is used in the following two examples, the phase plate 203 added to the imaging optical system differs in the following two examples. FIG. 2 shows the optical configuration of the focus depth extension image forming optical system (imaging lens unit) shown in FIG. 1. The left side of the figure shows an object side (subject side) and the right side of the figure shows an imaging side. In FIG. 2, SIm denotes the light-receiving plane of the imaging element 205. The imaging lens unit includes, from the object side to the image side, first to fourth lens groups G1 to G4, as illustrated in FIG. 2. The phase plate 203 and the aperture stop 204 are disposed between the second lens group G2 and the third lens group G3.

The first lens group G1 includes one positive meniscus lens L1 having a convex surface on the object side. The second lens group G2 includes a cemented lens in which a plano-convex lens L2 having a convex surface on the object side and a plano-concave lens L3 having a concave surface on the image side are cemented. The second lens group G2 has a negative refractive power. The third lens group G3 has a cemented lens in which a plano-concave lens L4 having a concave surface on the object side and a plano-convex lens L5 having a convex surface on the image side are cemented. The third lens group G3 has a negative refractive power. The fourth lens group G4 includes one biconvex lens L6. Namely, the imaging lens unit includes six lenses having a refractive power of positive, negative, negative, and positive from the objet side. The imaging lens unit from which the phase plate 203 is detached is the image forming optical system (lens unit). This image forming optical system has the common configuration both in Examples 1 and 2 as described above.

Table 1 shows the specific data of the lens unit.

TABLE 1

| Si | Ri | Di | Ndj | v dj |
|---|---|---|---|---|
| 1 | 12.226 | 2.1874 | 1.6223 | 53.2 |
| 2 | 28.2809 | 0.125 | | |
| 3 | 9.3191 | 3.1249 | 1.6074 | 56.6 |
| 4 | ∞ | 0.95 | 1.6034 | 38.0 |
| 5 | 5.6282 | 3.503 | | |
| 6 | ∞ | 3.5387 | | |
| 7 | −6.5248 | 0.95 | 1.6034 | 38.0 |
| 8 | ∞ | 2.749 | 1.6204 | 60.3 |
| 9 | −9.4774 | 0.125 | | |
| 10 | 74.2529 | 1.7499 | 1.6204 | 60.3 |
| 11 | −15.8335 | 17.5808 | | |

In Table 1, Si represents a surface number from the object side, Ri represents a curvature radius, Di represents a distance between surfaces, Ndj represents a refractive index, and vdj represents an Abbe's number. These signs are common both in Examples 1 and 2.

In addition, a length is represented by mm unless otherwise indicated. The surface number S6 represents the surface of the aperture stop 204.

Table 2 shows the data of the lens unit to which the phase plate 203 is added in Examples 1 and 2.

TABLE 2

| Si | Ri | Di | Ndi | v di |
|---|---|---|---|---|
| 1 | 12.226 | 2.1874 | 1.6223 | 53.2 |
| 2 | 28.2809 | 0.125 | | |
| 3 | 9.3191 | 3.1249 | 1.6074 | 56.6 |
| 4 | ∞ | 0.95 | 1.6034 | 38.0 |
| 5 | 5.6282 | 3.503 | | |
| ✶6 | ∞ | 0.6 | 1.4714 | 66.0 |
| 7 | ∞ | 2.9387 | | |
| 8 | −6.5248 | 0.95 | 1.6034 | 38.0 |
| 9 | ∞ | 2.749 | 1.6204 | 60.3 |
| 10 | −9.4774 | 0.125 | | |
| 11 | 74.2529 | 1.7499 | 1.6204 | 60.3 |
| 12 | −15.8335 | 17.5808 | | |

In Examples 1 and 2, the phase plate 203 is provided in the aperture stop 204 of the imaging lens unit to have contact therewith from the object side.

The object side surface (surface number 6) of the phase plate 203 has an aspheric surface shape. The aspheric surface shape differs between Examples 1 and 2.

Various equations are known for expressing the aspheric surface shape. The aspheric surface shape is defined by the following equation A by giving k and ai:

$$Z = c\,r^2/[1+\sqrt{1-(1+k)c^2\,r^2}] + \Sigma \alpha i\,\rho^i \quad (A)$$

where
c: curvature,
k: conic coefficient,
ai (i=1, 2, . . . ): multinomial coefficient,
r: height from optical axis,
z: sag amount, and
ρ: a normalized coordinate.

EXAMPLE 1

Table 3 shows the data of the aspheric surface shape of the phase plate in Example 1 as the aspheric surface coefficients.

TABLE 3

| ASPHERIC SURFACE COEFFICIENT | |
|---|---|
| K | 0 |
| α1 | 0 |
| α2 | −0.00252 |
| α3 | −0.00177 |
| α4 | 0.0024 |
| α5 | 0.0074 |
| α6 | 0.004203 |
| α7 | 0.001944 |
| α8 | 0.00042 |
| α9 | −0.00438 |
| α10 | −0.007 |
| α11 | −0.01187 |
| α12 | −0.00443 |
| α13 | −0.00062 |
| α14 | 0.010485 |
| α15 | 0.004541 |
| α16 | 0.001756 |

EXAMPLE 2

Table 4 shows the data of the aspheric surface of the phase plate in Example 2 as the aspheric surface coefficients.

TABLE 4

| ASPHERIC SURFACE COEFFICIENT | |
|---|---|
| K | 0 |
| α1 | 0 |
| α2 | −0.00085 |
| α3 | 0.004917 |
| α4 | −0.00336 |
| α5 | 8.51E−05 |
| α6 | 0.000932 |
| α7 | 0.002888 |
| α8 | −0.00204 |
| α9 | −0.00728 |
| α10 | −0.00559 |
| α11 | −0.00291 |
| α12 | −0.00061 |
| α13 | 0.004389 |
| α14 | 0.008824 |
| α15 | 0.00194 |
| α16 | 0.001876 |

In Examples 1 and 2, i=1 to 16 is shown as the multinomial coefficient ai. However, i: order is not limited to these. The equation for defining the aspheric surface shape is not limited to the above equation A, and various known equations can be used for defining the aspheric surface shape. In Examples 1 and 2, in the aspheric surface of the phase plate as the focus depth extension element, a paraxial curvature radius is ∞(curvature c=0), but the paraxial curvature may be c>0. In this case, it is apparent that the difference (sag amount after curve-fitting) between the aspheric surface and the spherical surface having a paraxial curvature radius R is the sag amount Z.

Figure 3:
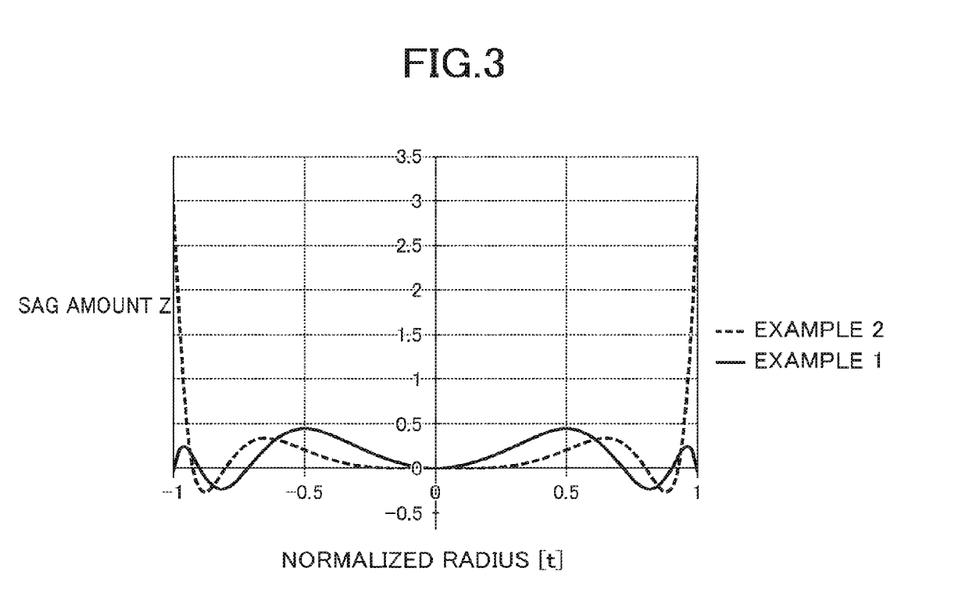
FIG. 3 is a graph showing an aspheric surface shape of a focus depth extension element in Examples 1 and 2.

FIG. 3 shows the aspheric surface shapes of Examples 1 and 2. In FIG. 3, the solid line shows the aspheric surface shape of Example 1, the dotted line shows the aspheric surface shape of Example 2, the vertical axis shows the sag amount Z, and the horizontal axis shows the normalized coordinate t (normalized radius t in FIG. 3).

The sag amount Z changes to be positive, negative, and positive in accordance with an increase in a distance from the optical axis in both of the aspheric surface shapes of Examples 1 and 2.

Figure 4:
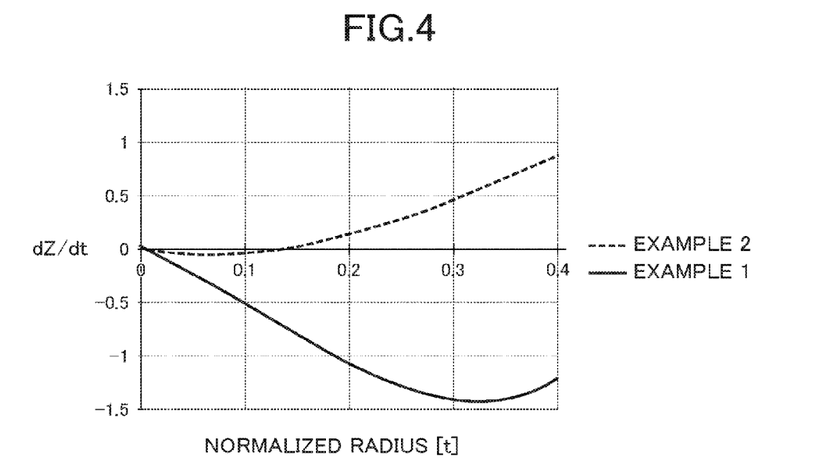
FIG. 4 is a graph showing a relationship between a normalized radius and $dZ/dt$.
Figure 5:
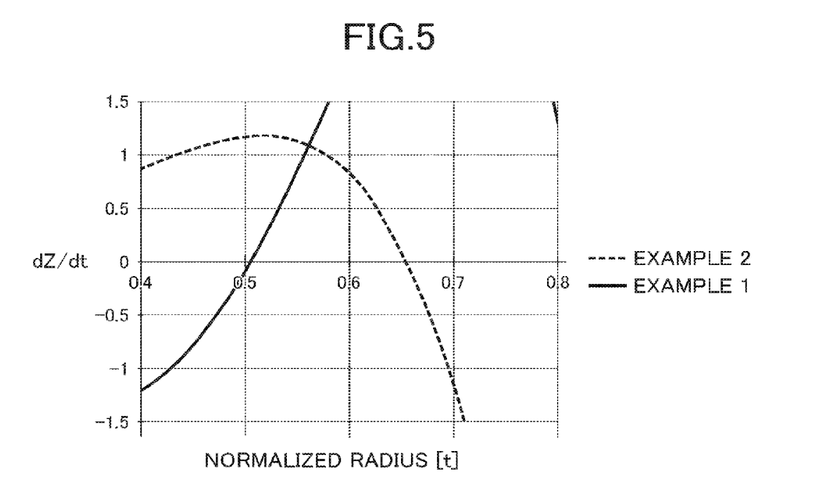
FIG. 5 is a graph showing a relationship between a normalized radius and $dZ/dt$.

FIGS. 4 and 5 show dZ/dt of Examples 1 and 2. In FIGS. 4 and 5, the solid line shows Example 1 and the dotted line shows Example 2.

FIG. 4 shows dZ/dt in 0<|t|<0.4. FIG. 5 shows dZ/dt in 0.4≤|t|<0.8.

As shown in FIGS. 4 and 5, in both of Examples 1 and 2, the maximum value of |dZ/dt| is 0.4 or more (FIG. 4) in 0<|t|<0.4.

Moreover, in both of Examples 1 and 2, in one point of 0.4≤|t|<0.8, dZ/dt=0 (FIG. 5). Furthermore, in 0.4≤|t|<0.8, the minimum value of dZ/dt is −0.1 or less and the maximum value is 1.0 or more (FIG. 5).

Figure 6:
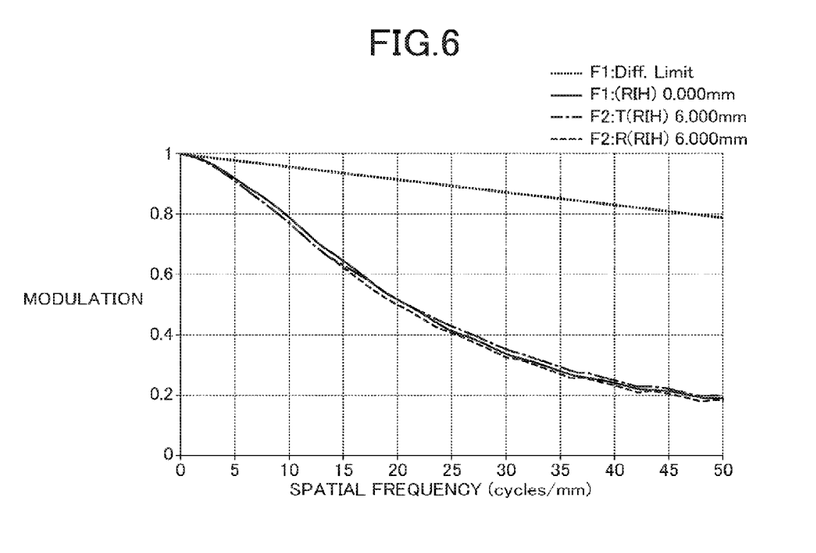
FIG. 6 is a graph showing MU curves of Example 1.
Figure 7:
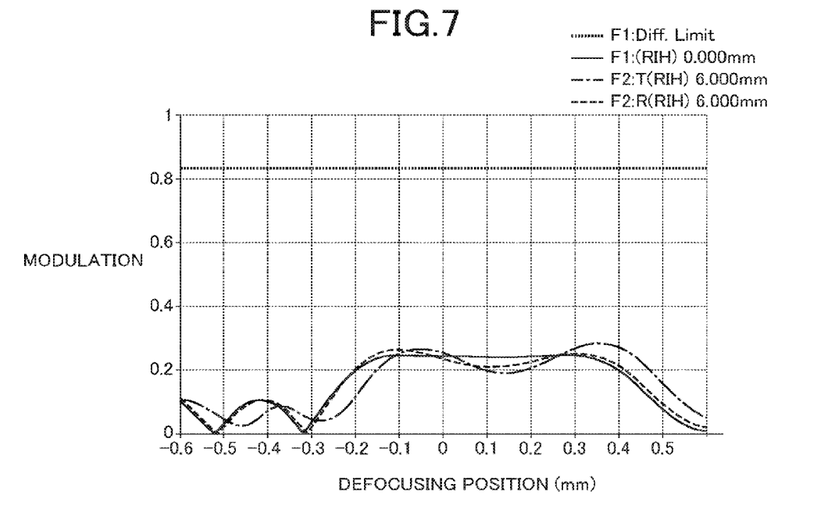
FIG. 7 is a graph showing MD curves of Example 1.

FIGS. 6 and 7 show MU curves and MD curves, respectively, before the restoration process in the image data of the image imaged by the imaging lens unit of Example 1.

In FIG. 6, the horizontal axis shows a spatial frequency and the vertical axis shows an MTF value.

In FIG. 7, the horizontal axis shows defocusing and the vertical axis shows an MTF value.

Figure 8:
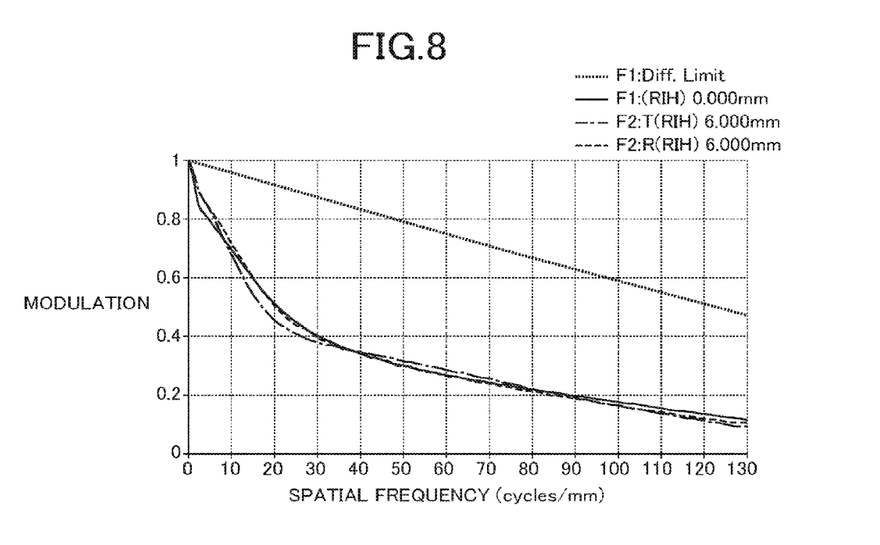
FIG. 8 is a graph showing MU curves of Example 2.
Figure 9:
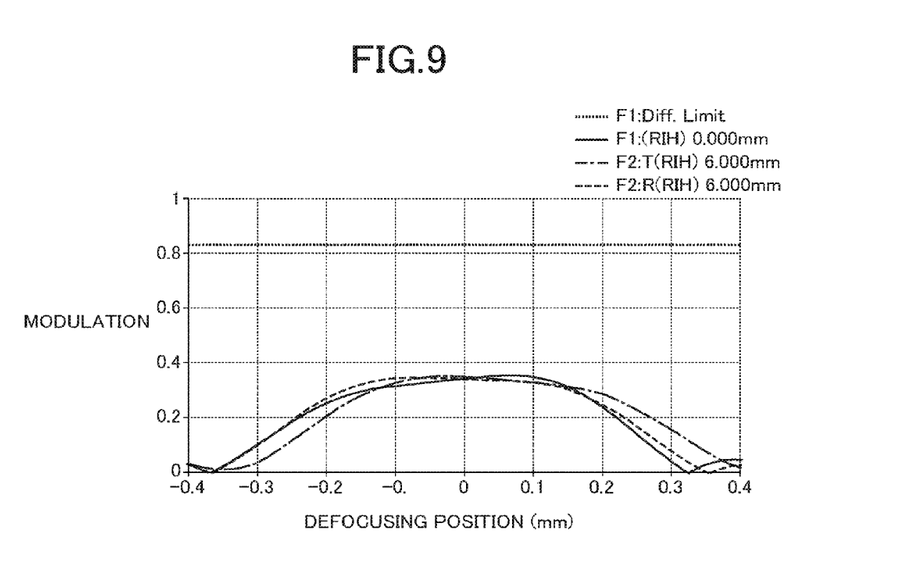
FIG. 9 is a graph showing MD curves of Example 2.

FIGS. 8 and 9 show MU curves and MD curves, respectively, before the restoration process in the image data of the image imaged by the imaging lens unit of Example 2.

The pixel pitch of the image sensor differs between Examples 1 and 2. The image sensors are designed in view of various requested resolution performances. The curves in FIGS. 6 to 9 are plotted with a center image height of 0 mm (F1) and a circumference image height of 6 mm (F2T and F2R) as an example. F2T represents a tangential direction and F2R represents a radial direction. It is preferable for the optical performance before the restoration process to be 0.1 or more when executing the restoration process. Namely, it is preferable to have the MU curve property to be less than 0.4 of MTF at the normalized frequency of 0.6, less than 0.5 of MTF at the normalized frequency of 0.4, and less than 0.8 of MTF at the normalized frequency of 0.2 when the frequency is normalized by Nyquist frequency.

In this case, a restoration filter for use in the calculation of the image process of restoring an image is easily calculated, and the resolution performance after the restoration process can be improved. The Nyquist frequencies when using the imaging lens unit of Examples 1 and 2 are 601 p/mm and 1351 p/mm, respectively, and these frequencies satisfy the above MU curve property. The focus depth extension element capable achieving the above optical performance can be easily designed by satisfying the condition to the sag amount Z and increasing the change in the sag amount of the end portion.

The restoring of the image by the image processor 206 is executed as the image process of restoring the above-described diffused PSF. An inverse filtering process or a Wiener filtering process, which is a typical image process, can be used for the image process. In this embodiment, the Wiener filtering process is used.

The image process using a Wiener filter has been known by, for example, Non-Patent Literature 1 (Hideyuki Tamura, Computer image process).

The Wiener filter is expressed by the following equation (B):

$$R(u,v)=[(H(u,v)]/\{|H(u,v)|^2+W(u,v)^2/S(u,v)^2\} \quad (B)$$

where
u, v: frequency in vertical and horizontal directions,
R (u, v): image process filter,
H (u, v): OTF of optical system,
S (u, v)$^2$: power spectrum of subject, and
W (u, v)$^2$: power spectrum of noise of image sensor.

Figure 10:
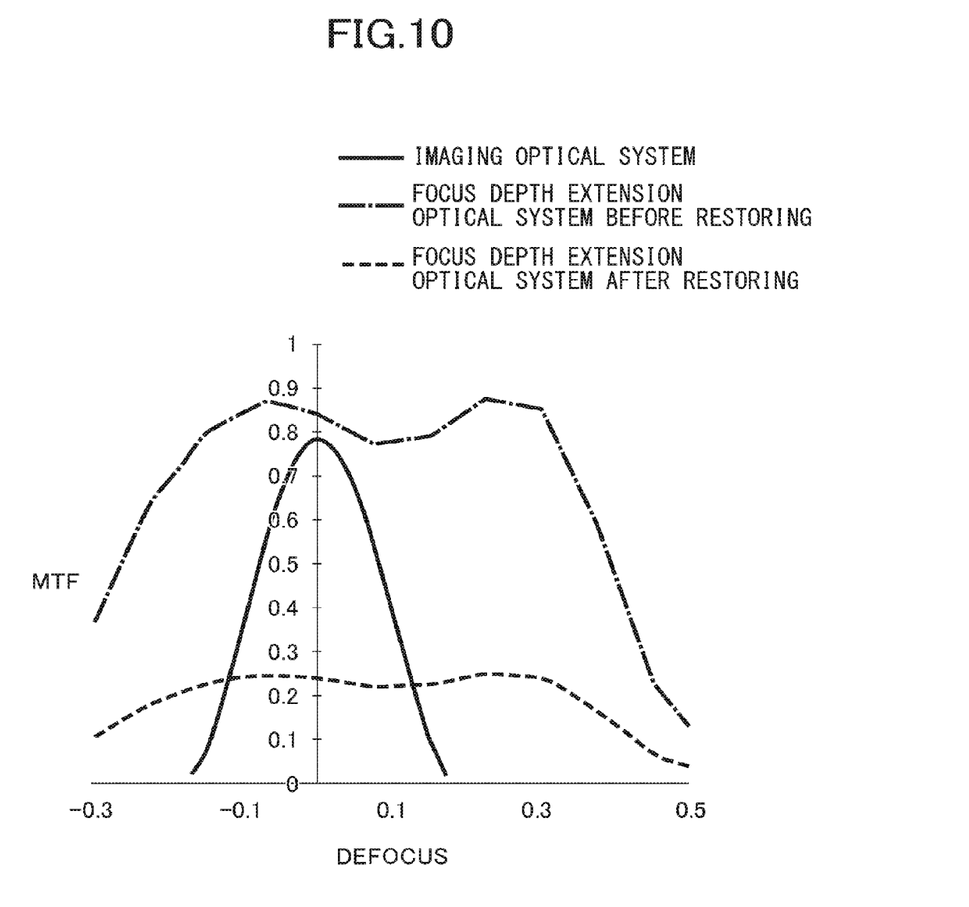
FIG. 10 is a graph showing MD curves before and after an image restoration process by an image processor when a focus depth extension imaging optical system of Example 1 is used.
Figure 11:
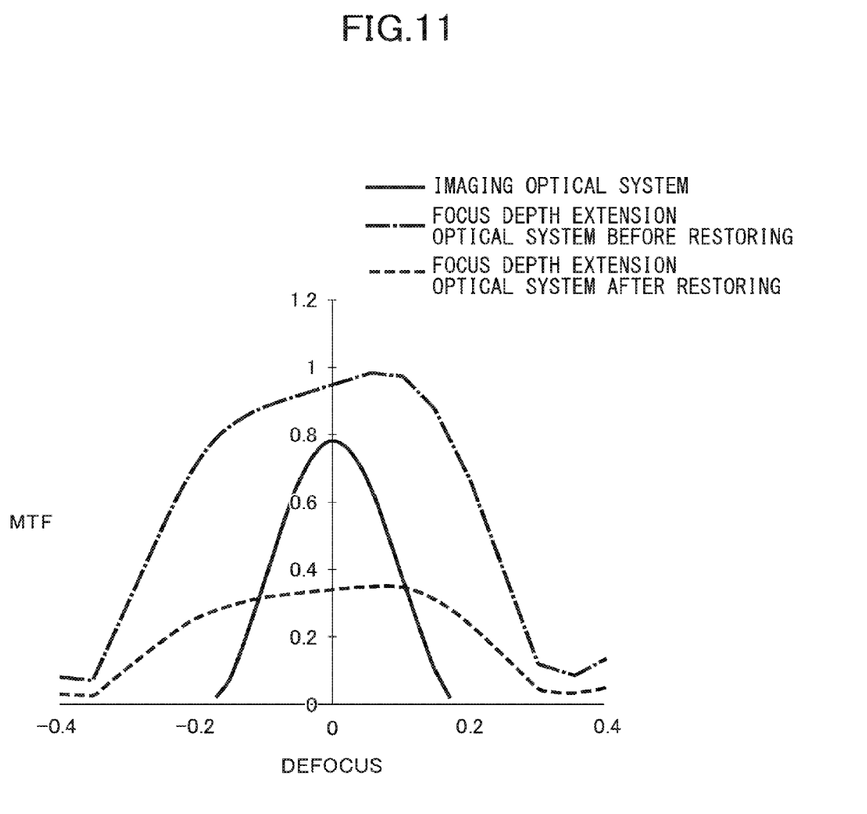
FIG. 11 is a graph showing MD curves before and after an image restoration process by an image processor when a focus depth extension imaging optical system of Example 2 is used.

FIG. 10 shows the MD curves of the image after the restoration process by the image process using the Wiener filter when the imaging lens unit of Example 1 is used. FIG. 11 shows the MD curves of the image after the restoration process by the image process using the Wiener filter when the imaging lens unit of Example 2 is used.

In FIGS. 10 and 11, the centers of the depth widths of the MD curves are approximately coincident before and after the restoration process both in Examples 1 and 2.

Accordingly, in the imaging apparatus using the focus depth extension imaging optical system in each of Examples 1 and 2, it is not necessary to adjust the position of the light-receiving plane of the imaging element both in the imaging by the image forming optical system to which the focus depth extension element is not added and in the imaging by the focus depth extension image forming optical system.

In the imaging apparatus using the focus depth extension image forming optical element, the MD curve of the restored image is planarized over a wide defocusing area. The imaging apparatus using the focus depth extension imaging optical system therefore has a deep depth of focus, a small deterioration in a restored image caused by positional shift of an imaging target, and a large allowance to a change in a distance to an object.

As described above, in Examples 1 and 2, the focus depth extension element to be added to the image forming optical system is also used as the aperture stop.

Figure 12:
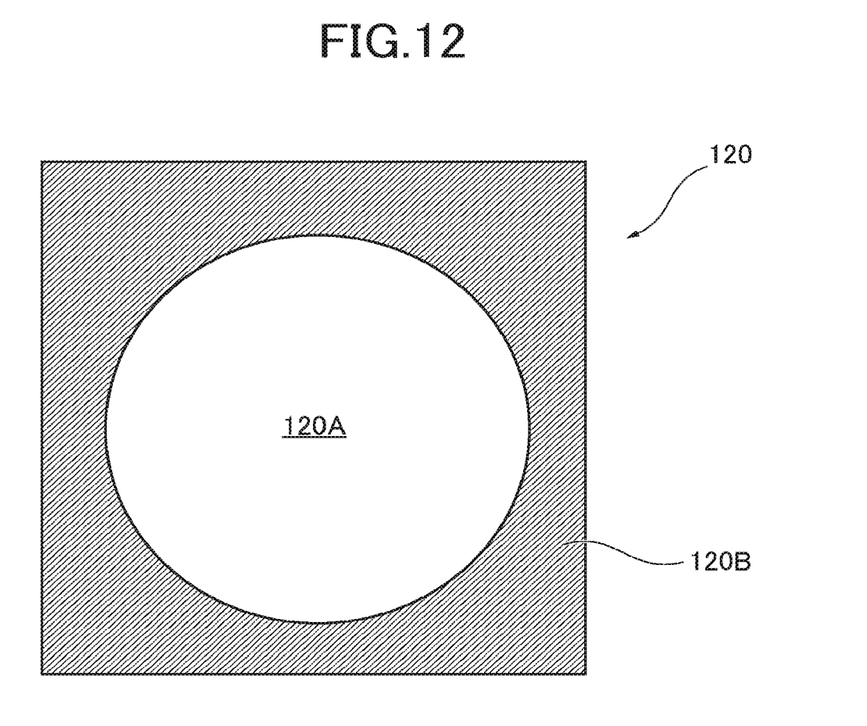
FIG. 12 is a view showing a focus depth extension element which is also used as an aperture stop.

FIG. 12 is a view showing the focus depth extension element which is also used as the aperture stop according to one example of the embodiment of the present invention. Reference number 120 denotes the focus depth extension element which is also used as the aperture stop. The focus depth extension element 120 includes in the central portion thereof an aspheric surface area 120A. The aspheric surface area 120A includes a shape which satisfies the above-described conditions. An area 120B outside the aspheric surface area 120A has a light-blocking property.

Such a focus depth extension element 120 is obtained by forming the aspheric surface area 120A in the center portion of a transparent plate and the light-blocking area 120B outside the aspheric surface area 120A. The light-blocking area 120B is formed of a light-blocking film.

The focus depth extension element 120 can be therefore added to the image forming optical system to be also used as the aperture stop. In this case, F value of the image forming optical system can be changed by adding the focus depth extension element 120 different from the aperture stop 204 of the image forming optical system.

A new focus depth extension imaging optical system, focus depth extension element, and imaging apparatus can be achieved as described below.

[1]
The focus depth extension image forming optical system includes the focus depth extension element 203 that extends a depth of focus of the image forming optical system. The focus depth extension element that is added to the image forming optical system has an aspheric surface shape rotationally symmetric about the optical axis of the image forming optical system. The sag amount Z of the aspheric surface shape changes at least to be negative, positive, and negative or positive, negative, and positive in accordance with an increase in a distance from the optical axis. In a range of 0<|t|<0.4 where |t| is a normalized radius of the aspheric surface shape, the maximum value of |dZ/dt| is 0.4 or more, and in one or more point of a range of 0.4≤|t|<0.8, dZ/dt=0 (Examples 1 and 2).

[2]
In the focus depth extension image forming optical system according to [1], in the range of 0.4≤|t|<0.8, the minimum value of dZ/dt is −0.1 or less and the maximum value of dZ/dt is 1.0 or more (Examples 1 and 2).

[3]
In the focus depth extension image forming optical system according [1] or [2], the focus depth extension element 203 is added near the aperture stop 204 of the image forming optical system.

[4]
In the focus depth extension image forming optical system according any one of [1] to [3], the focus depth extension element 120 includes the aspheric surface area 120A and the area outside the aspheric surface area, the area outside the aspheric surface area has a light-blocking property, and the focus depth extension element is used as the aperture stop.

[5]
In the focus depth extension image forming optical system according to any one of [1] to [4], the focus depth extension element 203 is detachable to the image forming optical system, and the image forming optical system is singularly used or is used as the focus depth extension image forming optical system having the focus depth extension element 203.

[6]
The focus depth extension element is added to the image forming optical system to extend a depth of focus. The focus depth extension element has ab aspheric surface shape rotationally symmetric about the optical axis of the image forming optical system. The sag amount Z of the aspheric surface shape changes at least to be negative, positive, and negative or positive, negative, and positive in accordance with an increase in a distance from the optical axis. In a range of 0<|t|<0.4 where |t| is a normalized radius of the aspheric surface shape, a maximum value of |dZ/dt| is 0.4 or more, and in one or more point of a range of 0.4≤|t|<0.8, dZ/dt=0 (Examples 1 and 2).

[8]
In the focus depth extension element according to [7], in the range of 0.4≤|t|<0.8, a minimum value of dZ/dt is −0.1 or less and the maximum value of dZ/dt is 1.0 or more (Example 1 and 2).

[9]
In the focus depth extension element according [7] or [8], the focus depth extension element includes the aspheric surface area 120A and the area outside the aspheric surface area, the area outside the aspheric surface area has a light-blocking property, and the focus depth extension element is used the an aperture stop.

[10]

The imaging apparatus includes the focus depth extension imaging optical system according any one of [1] to [5], the imaging element 205 that images the image of the subject 201 by the focus depth extension imaging optical system, and the image processor 206 that executes an image process on an image by the imaging element.

Although the present invention has been described in terms of an exemplary embodiment, it is not limited thereto. It should be appreciated that variations or modifications may be made in the embodiment described by persons skilled in the art without departing from the scope of the present invention as defined by the following claims. For example, in the above embodiment, the focus depth extension element is detachable to the image forming optical system. The focus depth extension image forming optical system can be configured by integrating the focus depth extension element and the image forming optical system.

It is apparent that the image forming optical system to which the focus depth extension element is added is not limited to the above embodiment. Namely, a known image forming optical system can be used by satisfying the above-described conditions for the aspheric surface shape of the focus depth extension element. The focus depth extension element having such an aspheric surface shape can maintain a high resolution of a restored image while extending a focus depth. The effects of the present embodiment are only preferable effects, and the effects of the present invention are not limited to the above.

What is claimed is:

1. A focus depth extension image forming optical system comprising:
    a focus depth extension element that extends a depth of focus of an image forming optical system,
    wherein the focus depth extension element that is added to the image forming optical system has an aspheric surface shape that is rotationally symmetric about an optical axis of the image forming optical system,
    a sag amount Z of the aspheric surface shape changes at least to be negative, positive, and negative or positive, negative, and positive in accordance with an increase in a distance from the optical axis,
    in a range of 0<|t|<0.4 where |t| is a normalized radius of the aspheric surface shape, a maximum value of |dZ/dt| is 0.4 or more, and
    in one or more point of a range of 0.4≤|t|<0.8, dZ/dt=0.

2. The focus depth extension image forming optical system according to claim 1,
    wherein in the range of 0.4≤|t|<0.8, a minimum value of dZ/dt is −0.1 or less and the maximum value of dZ/dt is 1.0 or more.

3. The focus depth extension image forming optical system according to claim 1,
    wherein the focus depth extension element is added near an aperture stop of the image forming optical system.

4. The focus depth extension image forming optical system according to claim 1,
    wherein the focus depth extension element includes an aspheric surface area and an area outside the aspheric surface area,
    the area outside the aspheric surface area has a light-blocking property, and
    the focus depth extension element is used as an aperture stop.

5. The focus depth extension image forming optical system according to claim 1,
    wherein the focus depth extension element is detachable to the image forming optical system, and
    the image forming optical system is singularly used or is used as the focus depth extension image forming optical system having the focus depth extension element.

6. A focus depth extension element that is added to an image forming optical system to extend a depth of focus, the focus depth extension element comprising;
    an aspheric surface shape that is rotationally symmetric about an optical axis of the image forming optical system,
    wherein a sag amount Z of the aspheric surface shape changes at least to be negative, positive, and negative or positive, negative, and positive in accordance with an increase in a distance from the optical axis,
    in a range of 0<|t|<0.4 where |t| is a normalized radius of the aspheric surface shape, a maximum value of |dZ/dt| is 0.4 or more, and
    in one or more point of a range of 0.4≤|t|<0.8, dZ/dt=0.

7. The focus depth extension element according to claim 6, wherein in the range of 0.4≤|t|<0.8, a minimum value of dZ/dt is −0.1 or less and the maximum value of dZ/dt is 1.0 or more.

8. The focus depth extension element according to claim 7, wherein
    the focus depth extension element includes an aspheric surface area and an area outside the aspheric surface area,
    the area outside the aspheric surface area has a light-blocking property, and
    the focus depth extension element is used as an aperture stop.

9. An imaging apparatus comprising:
    the focus depth extension imaging optical system according to claim 1;
    an imaging element that images an image of a subject by the focus depth extension imaging optical system; and
    an image processor that executes an image process on an image by the imaging element.

* * * * *